(12) United States Patent
Huang et al.

(10) Patent No.: US 11,265,953 B2
(45) Date of Patent: Mar. 1, 2022

(54) INTELLECTUAL HOST SWITCHING SYSTEM AND METHOD

(71) Applicant: Primax Electronics Ltd., Taipei (TW)

(72) Inventors: Che-Yen Huang, Taipei (TW); Ying-Che Tseng, Taipei (TW); Shi-Jie Zhang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 73 days.

(21) Appl. No.: 17/002,913

(22) Filed: Aug. 26, 2020

(65) Prior Publication Data

US 2022/0015178 A1 Jan. 13, 2022

(30) Foreign Application Priority Data

Jul. 10, 2020 (TW) .................................. 109123451

(51) Int. Cl.
| | | |
|---|---|---|
| *H04W 76/20* | (2018.01) | |
| *H04W 76/10* | (2018.01) | |
| *H04W 88/02* | (2009.01) | |
| *G06F 3/02* | (2006.01) | |
| *H04L 67/51* | (2022.01) | |
| *G06F 3/038* | (2013.01) | |
| *G06F 3/0354* | (2013.01) | |
| *H04W 4/80* | (2018.01) | |
| *G06F 3/033* | (2013.01) | |
| *G06F 3/048* | (2013.01) | |

(52) U.S. Cl.
CPC .............. *H04W 76/20* (2018.02); *G06F 3/02* (2013.01); *G06F 3/038* (2013.01); *G06F 3/03543* (2013.01); *H04L 67/16* (2013.01); *H04W 4/80* (2018.02); *H04W 76/10* (2018.02); *H04W 88/02* (2013.01); *G06F 3/033* (2013.01); *G06F 3/048* (2013.01)

(58) Field of Classification Search
None
See application file for complete search history.

(56) References Cited

U.S. PATENT DOCUMENTS 6,664,949 B1 * 12/2003 Amro .................... G06F 3/0231
345/156
7,162,232 B2 * 1/2007 Ramakesavan ....... H04W 76/14
455/420
(Continued)

*Primary Examiner* — Bob A Phunkulh
(74) *Attorney, Agent, or Firm* — Kirton McConkie; Evan R. Witt

(57) ABSTRACT

An intellectual host switching system is disclosed, which is installed in multi host devices, and comprises a host switching setting unit and a host switching executing unit. The host switching setting unit provides a plurality of color regions on a display screen of the host device, and the color regions are corresponding to multi host devices by a setting operation of host switching. In case of a pointer being moved to be in a color region as well as a motion distance of the pointer being smaller than a reference motion distance, the host switching executing unit executes a host switching operation after receiving a host switching command that is transmitted from a wireless inputting device, thereby making the wireless inputting device wirelessly connected with one host device be switched to be wirelessly connected with another one host device, without completing any Bluetooth pairing procedure.

20 Claims, 8 Drawing Sheets

(56) References Cited

U.S. PATENT DOCUMENTS

| | | | | |
|---|---|---|---|---|
| 8,706,031 B2* | 4/2014 | Nowlin | ............ | H04W 74/04 |
| | | | | 455/41.2 |
| 8,744,353 B2* | 6/2014 | Hsieh | ............ | G06F 3/038 |
| | | | | 455/41.2 |
| 8,904,056 B2* | 12/2014 | Robert | ............ | G06F 3/0231 |
| | | | | 710/17 |
| 9,041,655 B2* | 5/2015 | Chou | ............ | G06F 3/0231 |
| | | | | 345/168 |
| 9,824,836 B1* | 11/2017 | Robinson | ............ | G06F 3/023 |
| 2010/0225589 A1* | 9/2010 | Hsieh | ............ | G06F 3/0231 |
| | | | | 345/168 |
| 2011/0143671 A1* | 6/2011 | Hsieh | ............ | G06F 3/0231 |
| | | | | 455/41.2 |
| 2011/0217932 A1* | 9/2011 | Hsieh | ............ | H04B 7/00 |
| | | | | 455/41.3 |
| 2013/0217338 A1* | 8/2013 | Chou | ............ | G06F 3/03543 |
| | | | | 455/41.2 |
| 2014/0347279 A1* | 11/2014 | Chiang | ............ | G06F 3/0227 |
| | | | | 345/168 |
| 2016/0127516 A1* | 5/2016 | Chazot | ............ | H04L 69/18 |
| | | | | 710/11 |
| 2016/0277867 A1* | 9/2016 | Caine | ............ | H04B 17/318 |
| 2016/0278133 A1* | 9/2016 | Caine | ............ | H04W 76/10 |
| 2018/0173326 A1* | 6/2018 | Mathias | ............ | G06F 3/02 |
| 2018/0267624 A1* | 9/2018 | Hemes | ............ | G06F 3/0484 |
| 2020/0174639 A1* | 6/2020 | Sun | ............ | G06F 3/0393 |

\* cited by examiner

INTELLECTUAL HOST SWITCHING SYSTEM AND METHOD

FIELD OF THE INVENTION

The present invention relates to the technology field of multi-host switch, and more particularly to an intellectual host switching system and method.

BACKGROUND OF THE INVENTION

Nowadays, it is common to see that most of people also have smartphone and/or tablet computer in addition to possessing personal computer such as laptop computer or desk computer. In spite of the fact that smartphone and tablet computer are both allowed to be operated by finger touch, many people still tend to use physical keyboard, mouse, electronic drawing board, and/or touchpad in order to enhance working efficiency of operating smartphone or tablet computer. KVM switch device is known used for enabling multiple host devices to share a single USB peripheral device. However, it is a pity that, because electrical connections between the host devices, the USB peripheral device and the KVM switch device are achieved by USB cables, convenience of practical use of the KVM switch device is hence limited.

Accordingly, U.S. Pat. No. 8,904,056 discloses a multi-host wireless input device. FIG. 1 shows a diagram for describing an application of the multi-host wireless input device disclosed by U.S. Pat. No. 8,904,056. As FIG. 1 depicts that the wireless input device is a wireless computer keyboard 2in, and several host devices include a desk computer 2D that is electrically connected to a display device 2D1, a tablet computer 2T and a smartphone 2P. The wireless computer keyboard 2in wirelessly communicates with one of several hosts through a Bluetooth interface thereof. As described in more detail below, it needs to complete a Bluetooth pairing between a selected host device and the wireless computer keyboard 2in before using the wireless computer keyboard 2in to operate the selected host.

However, according to user's use experience, in case of the wireless computer keyboard 2in being wirelessly communicating with one host (e.g., tablet computer 2T), it is required to firstly complete the Bluetooth pairing between another one host such as smartphone 2P and the wireless computer keyboard 2in in order to use the wireless computer keyboard 2in to operate the smartphone 2P. As a result, for a user possessing multiple hosts, the multi-host wireless input device of U.S. Pat. No. 8,904,056 still fail to enable multiple hosts to share a single USB peripheral device by a convenient multi-host switching way.

From above descriptions, it is understood that there is still room for improvement in the conventional multi-host wireless input device. In view of that, inventors of the present application have made great efforts to make inventive research and eventually provided an intellectual host switching system and method.

SUMMARY OF THE INVENTION

A primary objective of the present invention is to provide an intellectual host switching system and method. The system is installed in a plurality of host devices, and comprises a host switching setting unit, a displacement calculation unit and a host switching executing unit. The host switching setting unit provides a host switching interface on a display screen of the host device, and the host switching interface has a plurality of color regions, such that the respective color regions can be corresponding to the respective host devices by a setting operation of host switching. According to the present invention, in case of a pointer (or cursor) being moved to be in a color region as well as a motion distance of the pointer being smaller than a reference motion distance, the host switching executing unit executes a host switching operation according to a host switching command that is transmitted from a wireless inputting device, thereby making the wireless inputting device wirelessly connected with one host device be switched to be wirelessly connected with another one host device, without completing any Bluetooth pairing procedure.

In other words, the system of the present invention facilitates the wireless inputting device that is being wirelessly connected to a first host device be switched to be wirelessly connected to a second host device by moving the pointer (or cursor) to click a color region showing on the display screen of the first host device. As a result, for a user possessing multiple host devices, the system of the present invention enable the multiple host devices to share a single wireless inputting device by a convenient and simple multi-host switching way.

To achieve the foregoing objective, the present invention provides one embodiment for the intellectual host switching system, which is applied in a plurality of host devices, so as to execute a host switching operation to make one wireless inputting device that is being wirelessly connected to one host device be switched to be wirelessly connected to another one host device, and comprises:

a host switching setting unit, being configured for providing a host switching interface consisting of a plurality of color regions on a display screen of the host device that is being wirelessly connected to the wireless inputting device, wherein the plurality of color regions are corresponding to the plurality of host devices after a setting operation of host switching is completed;

a displacement calculation unit, being configured for applying a first displacement calculation to a pointer that is shown on the display screen of the host device, and applying a second displacement calculation to the wireless inputting device; and a host switching executing unit;

wherein after the pointer is moved to be in one of the plurality of color regions, the displacement calculation unit executing the first displacement calculation at least twice so as to correspondingly obtain at least two pointer displacement values, and the displacement calculation unit also executing the second displacement calculation at least twice for correspondingly obtain at least two vertical displacement values;

wherein in case of the at least two pointer displacement values being both smaller than a reference pointer displacement value as well as the at least two vertical displacement values being both smaller than a reference vertical displacement value, the host switching executing unit executing a host switching operation after receiving a host switching command that is transmitted from the wireless inputting device, thereby making the wireless inputting device that is being wirelessly connected with one host device be switched to be wirelessly connected with another one host device.

In the embodiment of the forgoing intellectual host switching system, the host device is selected from the group consisting of desk computer, industrial computer, tablet computer, smart phone, and smart TV.

In the embodiment of the forgoing intellectual host switching system, the pointer is a cursor, and the wireless inputting device is a wireless mouse having a connection indicating light; wherein after making the wireless inputting device that is being wirelessly connected with one host device be switched to be wirelessly connected with another one host device by moving the pointer into a specific color region, the connection indicating light emits an indication light, and a color of the indication light is the same as that of the specific color region.

In the embodiment of the forgoing intellectual host switching system, the wireless mouse includes a lift of distance (LOD) sensor, and the displacement calculation unit receiving an LOD signal transmitted from the LDO sensor so as to complete the second displacement calculation.

In the embodiment of the forgoing intellectual host switching system, in the host switching command is transmitted out by the wireless inputting device after a left mouse button is pressed.

In the embodiment of the forgoing intellectual host switching system, in case of the at least two pointer displacement values being both smaller than the reference pointer displacement value as well as the at least two vertical displacement values being both smaller than the reference vertical displacement value, the host switching executing unit executes a wireless connection interrupting operation after receiving a wireless connection interrupting command that is transmitted from the wireless inputting device, thereby interrupting a wireless connection between the wireless inputting device and the host device.

In the embodiment of the forgoing intellectual host switching system, the wireless connection interrupting command is transmitted out by the wireless inputting device after a right mouse button is pressed.

In the embodiment of the forgoing intellectual host switching system, the pointer is a cursor, and the wireless inputting device is a wireless computer keyboard having a connection indicating light and a cursor movement controlling unit; wherein after making the wireless inputting device that is being wirelessly connected with one host device be switched to be wirelessly connected with another one host device by moving the pointer into a specific color region, the connection indicating light emits an indication light, and a color of the indication light is the same as that of the specific color region. Moreover, the cursor movement controlling unit is selected from the group consisting of trackball, touchpad, and a plurality of key buttons of the wireless computer keyboard that is configured for being as a cursor movement controller.

In the embodiment of the forgoing intellectual host switching system, the pointer is a mouse cursor or a dot cursor, and the wireless inputting device is a wireless electronic graphing device comprising a graphing pen and a graphing pad having a connection indicating light; wherein after making the wireless inputting device that is being wirelessly connected with one host device be switched to be wirelessly connected with another one host device by moving the pointer into a specific color region, the connection indicating light emitting an indication light, and a color of the indication light is the same as that of the specific color region.

Moreover, for achieving the foregoing objective, the present invention also provides one embodiment for the intellectual host switching method, which is applied for executing a host switching operation to make one wireless inputting device that is being wirelessly connected to one host device be switched to be wirelessly connected to another one host device, and comprises following steps:

(1) providing a host switching setting unit in a plurality of host devices, and showing a host switching interface consisting of a plurality of color regions, by the host switching setting unit, on a display screen of the host device that is being wirelessly connected to the wireless inputting device; wherein the plurality of color regions are corresponding to the plurality of host devices after a setting operation of host switching is completed;

(2) providing a displacement calculation unit in the plurality of host devices, so as to apply a first displacement calculation to a pointer at least twice for correspondingly obtain at least two pointer displacement values, and also apply a second displacement calculation to the wireless inputting device at least twice for correspondingly obtain at least two vertical displacement values; and (3) providing a host switching executing unit in the plurality of host devices, such that in case of the at least two pointer displacement values being both smaller than a reference pointer displacement value as well as the at least two vertical displacement values being both smaller than a reference vertical displacement value, the host switching executing unit executing a host switching operation after receiving a host switching command that is transmitted from the wireless inputting device, thereby making the wireless inputting device that is being wirelessly connected with one host device be switched to be wirelessly connected with another one host device.

In the embodiment of the forgoing intellectual host switching method, the host device is selected from the group consisting of desk computer, industrial computer, tablet computer, smart phone, and smart TV.

In the embodiment of the forgoing intellectual host switching method, the pointer is a cursor, and the wireless inputting device is a wireless mouse having a connection indicating light; wherein after making the wireless inputting device that is being wirelessly connected with one host device be switched to be wirelessly connected with another one host device by moving the pointer into a specific color region, the connection indicating light emits an indication light, and a color of the indication light is the same as that of the specific color region.

In the embodiment of the forgoing intellectual host switching method, the wireless mouse includes a lift of distance (LOD) sensor, and the displacement calculation unit receiving an LOD signal transmitted from the LDO sensor so as to complete the second displacement calculation.

In the embodiment of the forgoing intellectual host switching method, in the host switching command is transmitted out by the wireless inputting device after a left mouse button is pressed.

In the embodiment of the forgoing intellectual host switching method, in case of the at least two pointer displacement values being both smaller than the reference pointer displacement value as well as the at least two vertical displacement values being both smaller than the reference vertical displacement value, the host switching executing unit executes a wireless connection interrupting operation after receiving a wireless connection interrupting command that is transmitted from the wireless inputting device, thereby interrupting a wireless connection between the wireless inputting device and the host device.

In the embodiment of the forgoing intellectual host switching method, the wireless connection interrupting command is transmitted out by the wireless inputting device after a right mouse button is pressed.

In the embodiment of the forgoing intellectual host switching method, the pointer is a cursor, and the wireless inputting device is a wireless computer keyboard having a connection indicating light and a cursor movement controlling unit; wherein after making the wireless inputting device that is being wirelessly connected with one host device be switched to be wirelessly connected with another one host device by moving the pointer into a specific color region, the connection indicating light emits an indication light, and a color of the indication light is the same as that of the specific color region. Moreover, the cursor movement controlling unit is selected from the group consisting of trackball, touchpad, and a plurality of key buttons of the wireless computer keyboard that is configured for being as a cursor movement controller.

In the embodiment of the forgoing intellectual host switching method, the pointer is a mouse cursor or a dot cursor, and the wireless inputting device is a wireless electronic graphing device comprising a graphing pen and a graphing pad having a connection indicating light; wherein after making the wireless inputting device that is being wirelessly connected with one host device be switched to be wirelessly connected with another one host device by moving the pointer into a specific color region, the connection indicating light emitting an indication light, and a color of the indication light is the same as that of the specific color region.

DETAILED DESCRIPTION OF THE PREFERRED EMBODIMENT

The advantages and features of an intellectual host switching system and method according to the present invention are described in details with reference to examples of embodiments and accompanying drawings to be more easily understood. However, the present invention may be implemented in different forms, and should not be construed as limited to only embodiments described herein. Conversely, for a person skilled in the art, the embodiments are provided for making the disclosure more thorough and comprehensive and completely conveying the scope of the present invention.

First Embodiment

Figure 1:
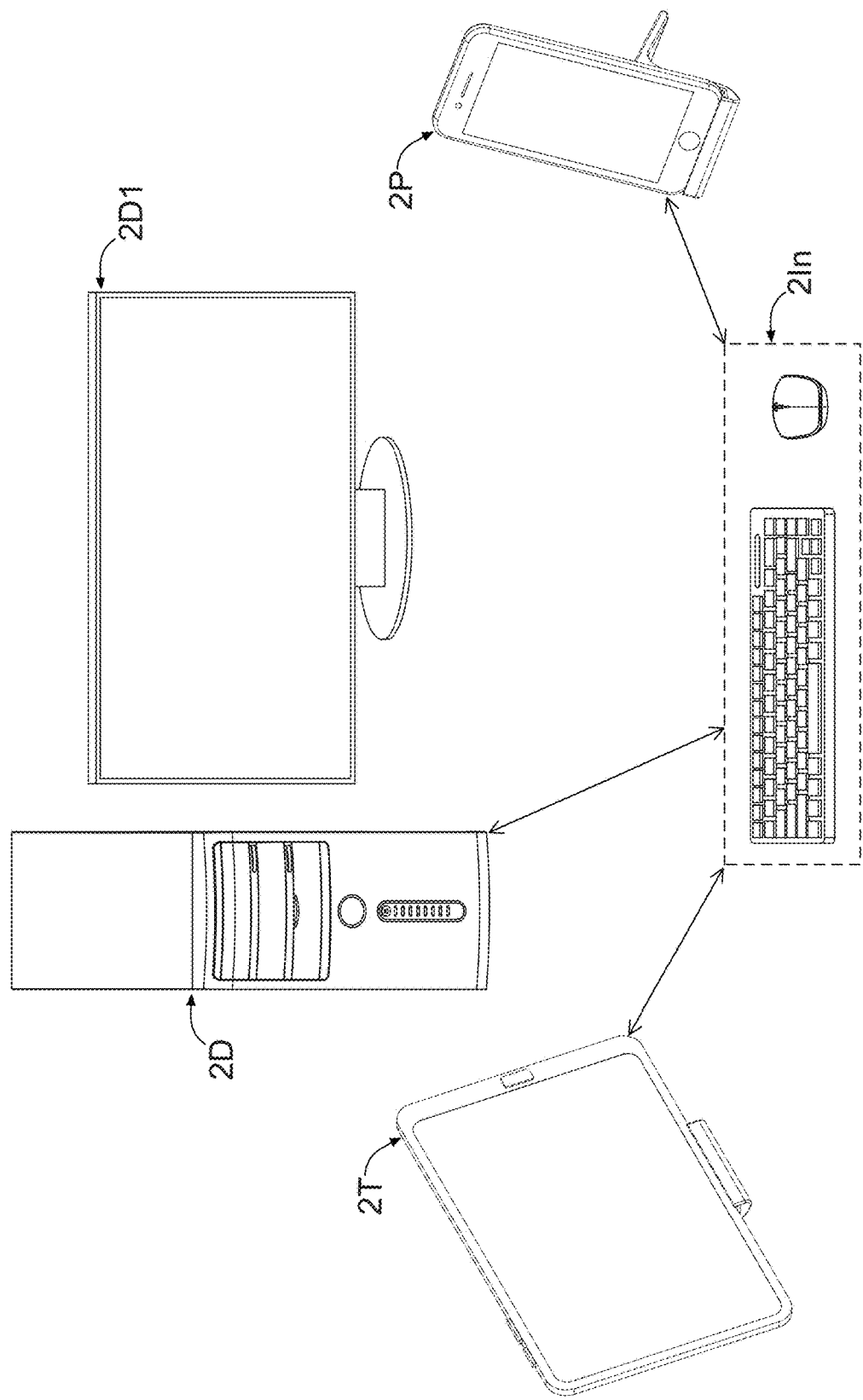
FIG. 1 shows a diagram for describing an application of a conventional multi-host wireless input device disclosed by U.S. Pat. No. 8,904,056.
Figure 2:
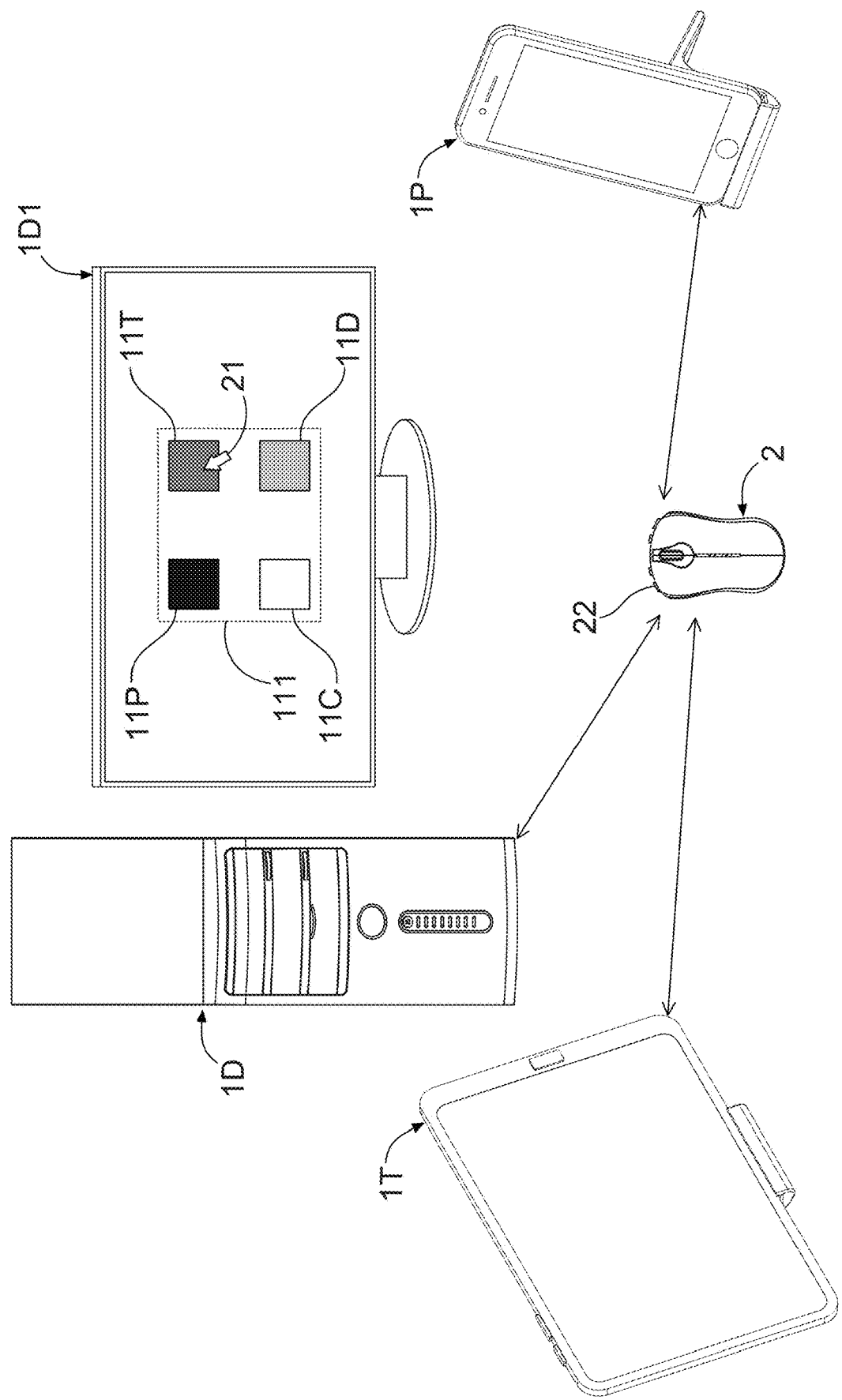
FIG. 2 shows a diagram for describing an application of an intellectual host switching system according to the present invention.
Figure 3:
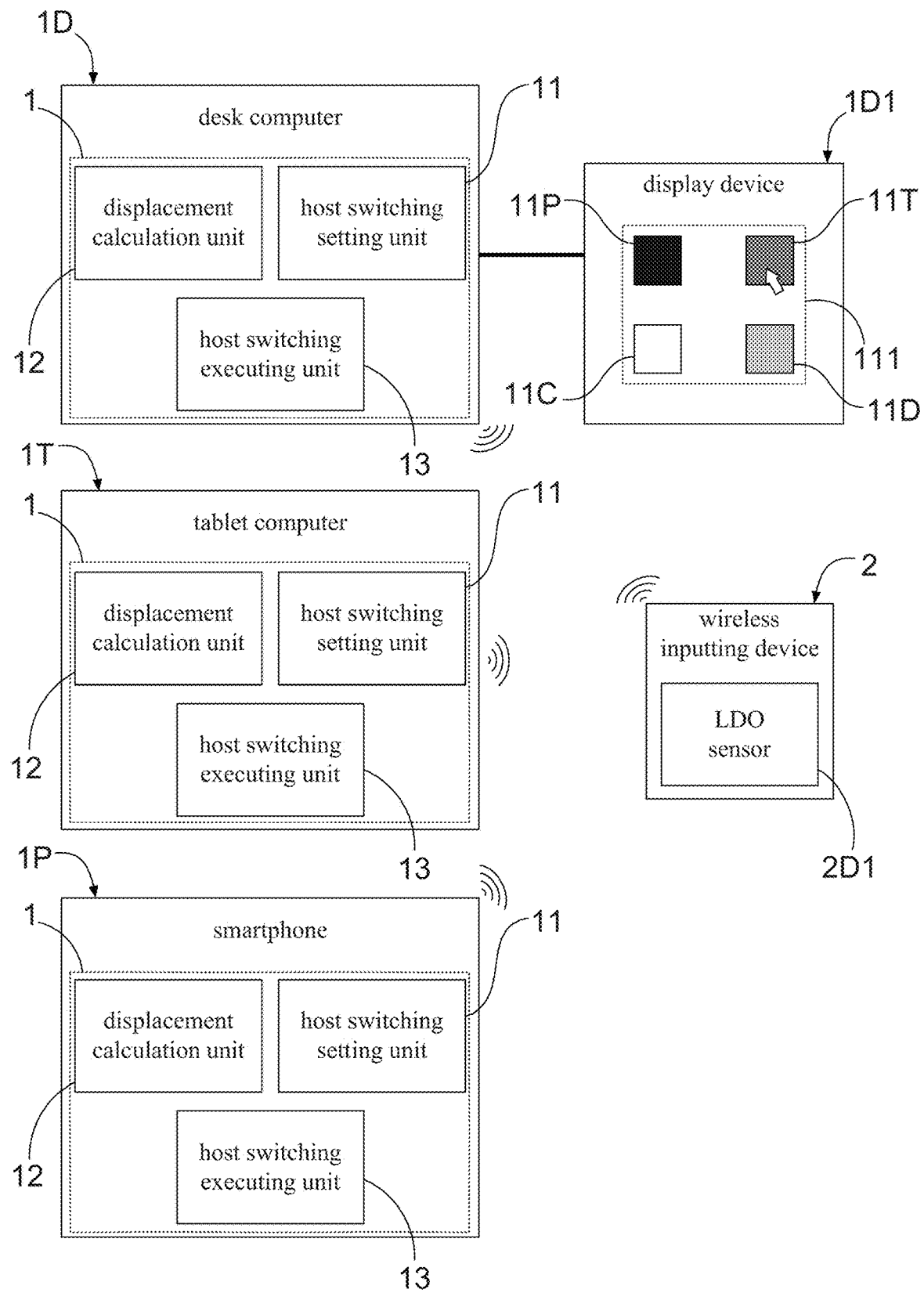
FIG. 3 shows a block diagram of a plurality of host devices that is installed with the intellectual host switching system according to the present invention.

With reference to FIG. 2, there is shown a diagram for describing an application of an intellectual host switching system according to the present invention. Moreover, FIG. 3 illustrates a block diagram of a plurality of host devices that is installed with the intellectual host switching system according to the present invention. The intellectual host switching system 1 of the present invention is installed in a plurality of host devices, so as to execute a host switching operation to make one wireless inputting device 2 that is being wirelessly connected to one host device be switched to be wirelessly connected to another one host device. In a practicable embodiment, the host device can be any one type of electronic device, such as desk computer, industrial computer, tablet computer, smart phone, or smart TV. For example, FIG. 2 depicts three host devices of a tablet computer 1T, a smartphone 1P and a desk computer 1D that is electrically connected to a display device 1D1 are installed with the intellectual host switching system 1 of the present invention.

According to the present invention, the intellectual host switching system 1 comprises: a host switching setting unit 11, a displacement calculation unit 12, and a host switching executing unit 13. In which, the host switching setting unit 11 is configured for providing a host switching interface 111 consisting of a plurality of color regions on a display screen of the host device (e.g., desk computer 1D) that is currently wirelessly connected to the wireless inputting device 2. FIG. 2 and FIG. 3 depict that the plurality of color regions includes first color region 11D, second color region 11T, third color region 11P, and fourth color region 11C, wherein the first color region 11D, the second color region 11T, and the third color region 11P are corresponding to the desk computer 1D, the tablet computer 1T and the smartphone 1p after a setting operation of host switching is completed. As described in more detail below, the forgoing setting operation of host switching can be executed during a Bluetooth pairing between one host device and the wireless inputting device 2 being executed.

On the other hand, the displacement calculation unit 12 is configured for applying a first displacement calculation to a pointer 21 that is shown on a display screen, and applying a second displacement calculation to the wireless inputting device 2. For instance, the wireless inputting device 2 is a wireless mouse having a connection indicating light 22, and the pointer 21 is a mouse cursor. When the intellectual host switching system 1 normally works, the displacement calculation unit 12 executes the first displacement calculation at least twice after the pointer 21 is moved to be in the second color region 11T, so as to obtain at least two pointer displacement values. Moreover, the displacement calculation unit 12 also executes the second displacement calculation at least twice for correspondingly obtain at least two vertical displacement values. It is worth further explaining that, the wireless mouse (i.e., wireless inputting device 2) includes a lift of distance (LOD) sensor 2D1, such that the displacement calculation unit 12 receives an LOD signal transmitted from the LDO sensor 2D1 so as to complete the second displacement calculation. It should be understood that, the wireless mouse also includes an optical sensor, such that the displacement calculation unit 12 receives an optical signal transmitted from the optical sensor so as to complete the first displacement calculation. Therefore, when the pointer 21 stays in the second color region 11T for letting the pointer displacement value be smaller than a reference pointer displacement value and the vertical displacement value be smaller than a reference vertical displacement value, the host switching executing unit 13 executes a host switching operation after receiving a host switching command that is transmitted from the wireless inputting device 2, thereby making the wireless inputting device 2 that is being wirelessly connected with one host device (e.g., desk computer 1D) be switched to be wirelessly connected with another one host device (e.g., tablet computer 1T).

In other words, the intellectual host switching system 1 of the present invention facilitates the wireless inputting device 2 that is currently wirelessly connected to a first host device be switched to be wirelessly connected to a second host device by moving the pointer 21 to click a color region showing on the display screen of the first host device, without completing any Bluetooth pairing procedure. As described in more detail below, after moving the pointer 21 to stay in the second color region 11T, user needs to subsequently press a left mouse button of the wireless inputting device (i.e., wireless mouse) 2 so as to transmit the host switching command to the desk computer 1D for driving the host switching executing unit 12 to execute the host switching operation, thereby making the wireless inputting device 2 that is being wirelessly connected with the desk computer 1D be switched to be wirelessly connected with the tablet computer 1T. It is worth further explaining that, according to the present invention, in case of the conditions including (1) the pointer 21 staying in the second color region 11T, (2) the calculated pointer displacement value being smaller than the reference pointer displacement value and (3) the calculated vertical displacement values being smaller than a reference vertical displacement value are all achieved, the host switching executing unit 12 would judge that the user desires to make the wireless inputting device 2 that is being wirelessly connected with the desk computer 1D be switched to be wirelessly connected with the tablet computer 1T, thereby automatically executing the host switching operation even though a host switching command does not be transmitted from the wireless inputting device 2, without needing to pressing the left mouse button.

Since the wireless inputting device 2 and each host device have already completed the Bluetooth pairing in advance, each host device would store with a corresponding link key. As such, after the pointer 21 is move to click the second region 11T, the intellectual host switching system 1 of the present invention immediately enable the wireless connection between the wireless inputting device 2 and the tablet computer 1T.

Moreover, according to the present invention, after making the wireless inputting device 2 that is being wirelessly connected with the desk computer 1D be switched to be wirelessly connected with the tablet computer 1T by moving the pointer to click the second region 11T, the connection indicating light 22 of the wireless mouse emits an indication light, wherein a color of the indication light is the same as that of the second region 11T.

Of course, user can also utilize the system 1 of the present invention to interrupt the wireless connection between the wireless inputting device 2 and the host device. For executing a wireless connection interrupting operation, user needs to move the pointer 21 into a color region (e.g., first color region 1D), and then subsequently press a right mouse button of the wireless inputting device (i.e., wireless mouse) 2 so as to transmit a wireless connection interrupting command to the host device (e.g., desk computer 1D) that is being wirelessly connected with the wireless inputting device 2. As described in more detail below, in case of the conditions including (1) the pointer 21 staying in one color region, (2) the calculated pointer displacement value being smaller than the reference pointer displacement value and (3) the calculated vertical displacement values being smaller than a reference vertical displacement value are all achieved, the host switching executing unit 12 would be informed, by receiving a wireless connection interrupting command that is transmitted from the wireless inputting device, to execute a wireless connection interrupting operation for interrupting a wireless connection between the wireless inputting device 2 and the host device.

Second Embodiment

Figure 4:
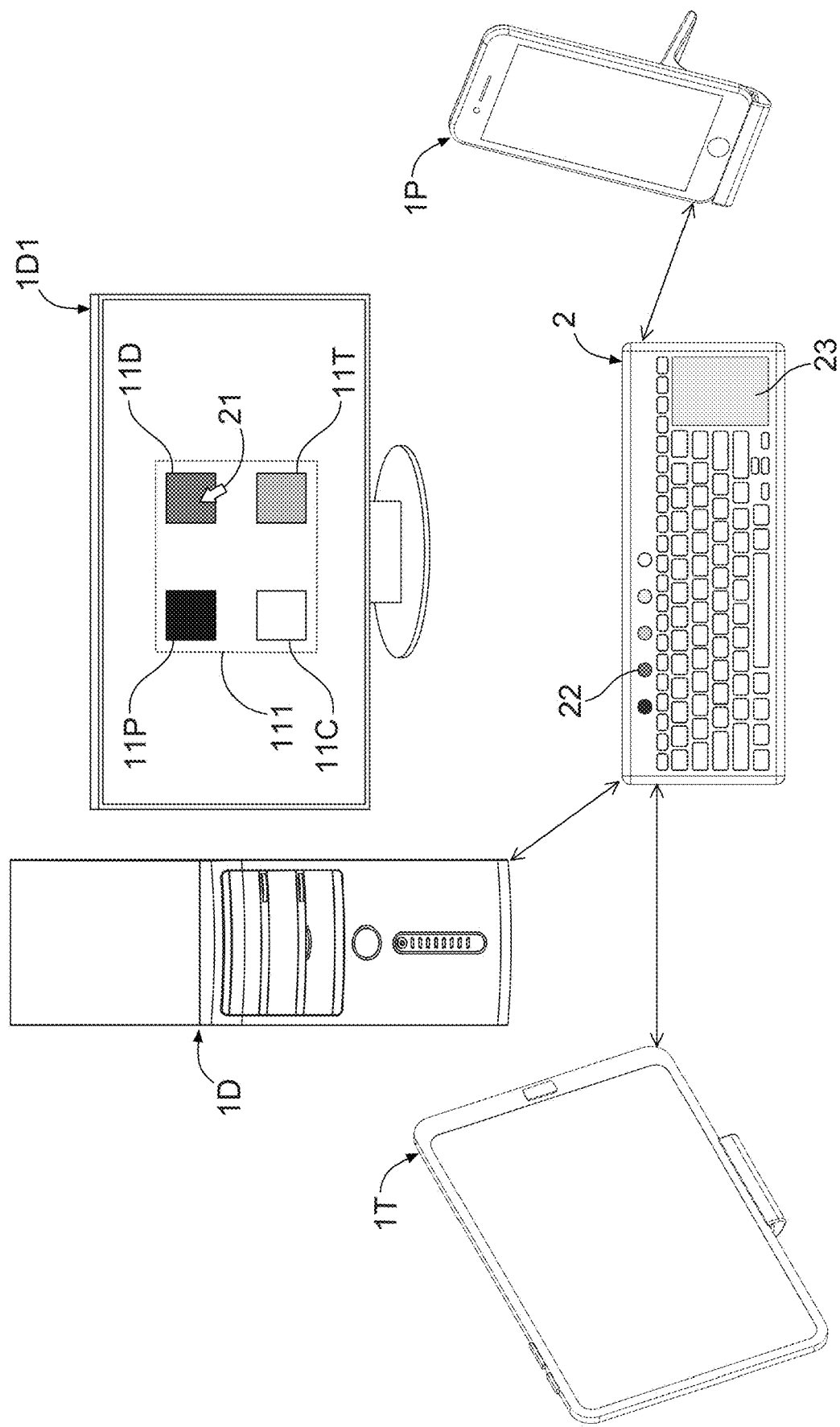
FIG. 4 shows a diagram for describing an application of an intellectual host switching system according to the present invention.

FIG. 4 shows a diagram for describing an application of an intellectual host switching system according to the present invention. From FIG. 4, it is known that the wireless inputting device 2 is a wireless computer keyboard having a connection indicating light 22 and a cursor movement controlling unit 23, and the pointer 21 is a cursor. Moreover, FIG. 4 depicts that the cursor movement controlling unit 23 is a touchpad. By using the touchpad, user can move the pointer 21 to click the second color region 11T in order to make the wireless inputting device 2 that is being wirelessly connected with the desk computer 1D be switched to be wirelessly connected with the tablet computer 1T. Of course, by using the touchpad, user can move the pointer 21 into the first color region 11D, and then interrupt the wireless connection between the wireless inputting device 2 and the desk computer 1D by press a right button of the touchpad.

Third Embodiment

Figure 5:
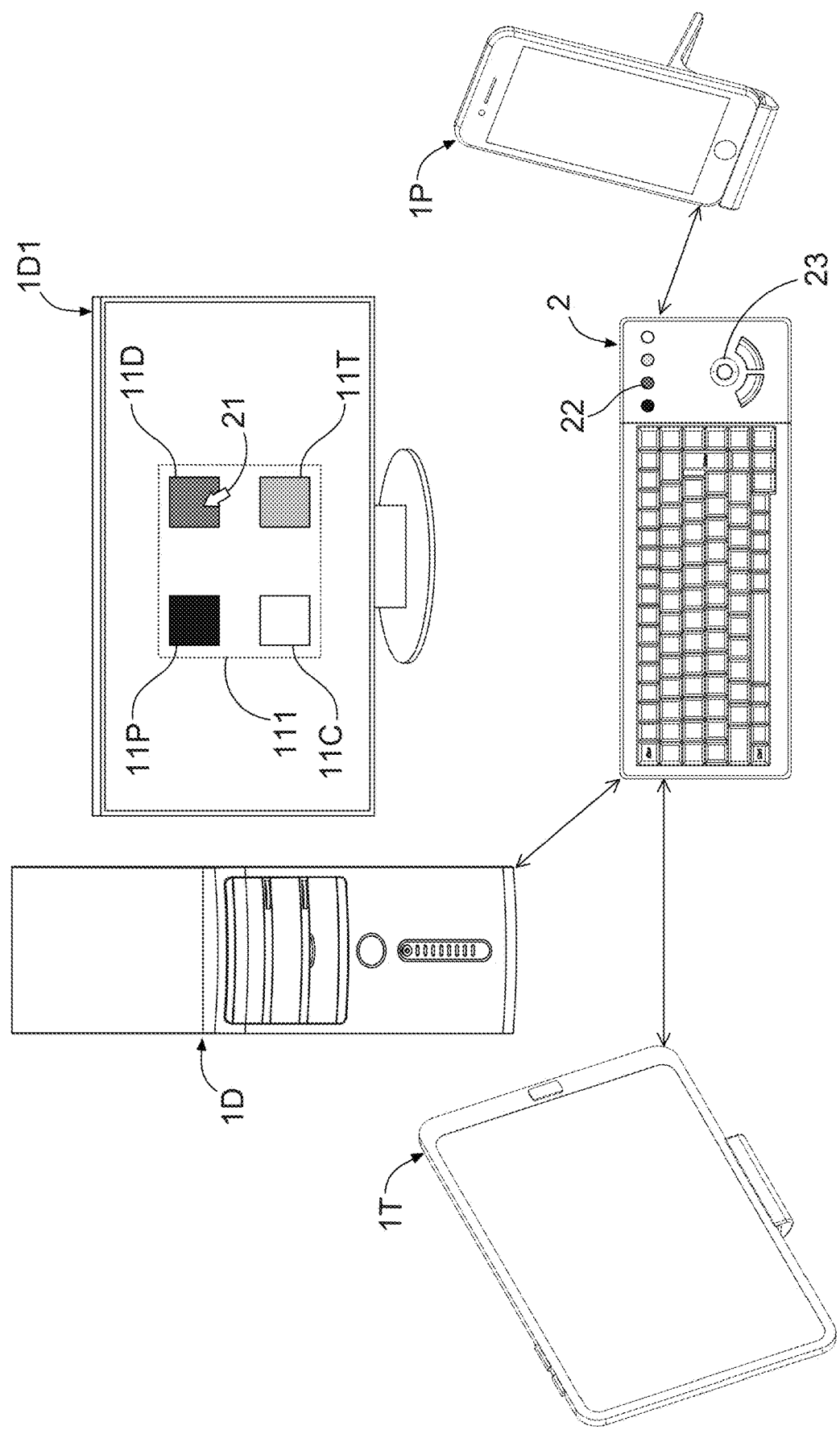
FIG. 5 shows a diagram for describing an application of an intellectual host switching system according to the present invention.

FIG. 5 shows a diagram for describing an application of an intellectual host switching system according to the present invention. From FIG. 5, it is known that the wireless inputting device 2 is a wireless computer keyboard having a connection indicating light 22 and a cursor movement controlling unit 23, and the pointer 21 is a cursor. Moreover, FIG. 5 depicts that the cursor movement controlling unit 23 is a trackball. By using the trackball, user can move the pointer 21 to click the second color region 11T in order to make the wireless inputting device 2 that is being wirelessly connected with the desk computer 1D be switched to be wirelessly connected with the tablet computer 1T. Of course, by using the touchpad, user can move the pointer 21 into the first color region 11D, and then interrupt the wireless connection between the wireless inputting device 2 and the desk computer 1D by press a right button of the trackball.

Fourth Embodiment

Figure 6:
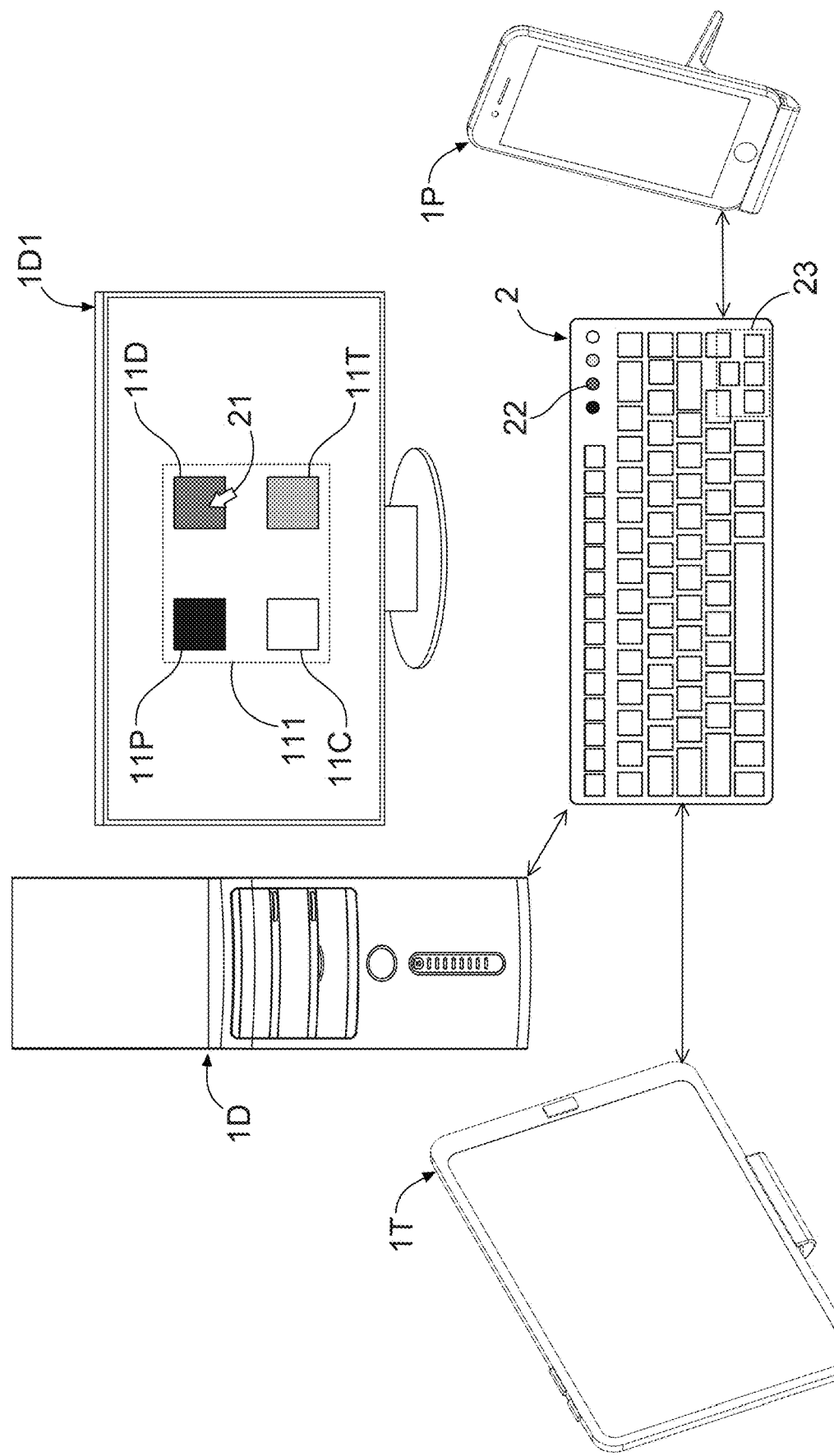
FIG. 6 shows a diagram for describing an application of an intellectual host switching system according to the present invention.

FIG. 6 shows a diagram for describing an application of an intellectual host switching system according to the present invention. From FIG. 6, it is known that the wireless inputting device 2 is a wireless computer keyboard having a connection indicating light 22 and a cursor movement controlling unit 23, and the pointer 21 is a cursor. Moreover, FIG. 6 depicts that a plurality of key buttons of the wireless computer keyboard that is configured for being as a cursor movement controlling unit 23. By using the cursor movement controlling unit 23, user can move the pointer 21 to click the second color region 11T in order to make the wireless inputting device 2 that is being wirelessly connected with the desk computer 1D be switched to be wirelessly connected with the tablet computer 1T. Of course, by using the cursor movement controlling unit 23, user can move the pointer 21 into the first color region 11D, and then interrupt the wireless connection between the wireless inputting device 2 and the desk computer 1D by press a button of the cursor movement controlling unit 23.

Sixth Embodiment

Figure 7:
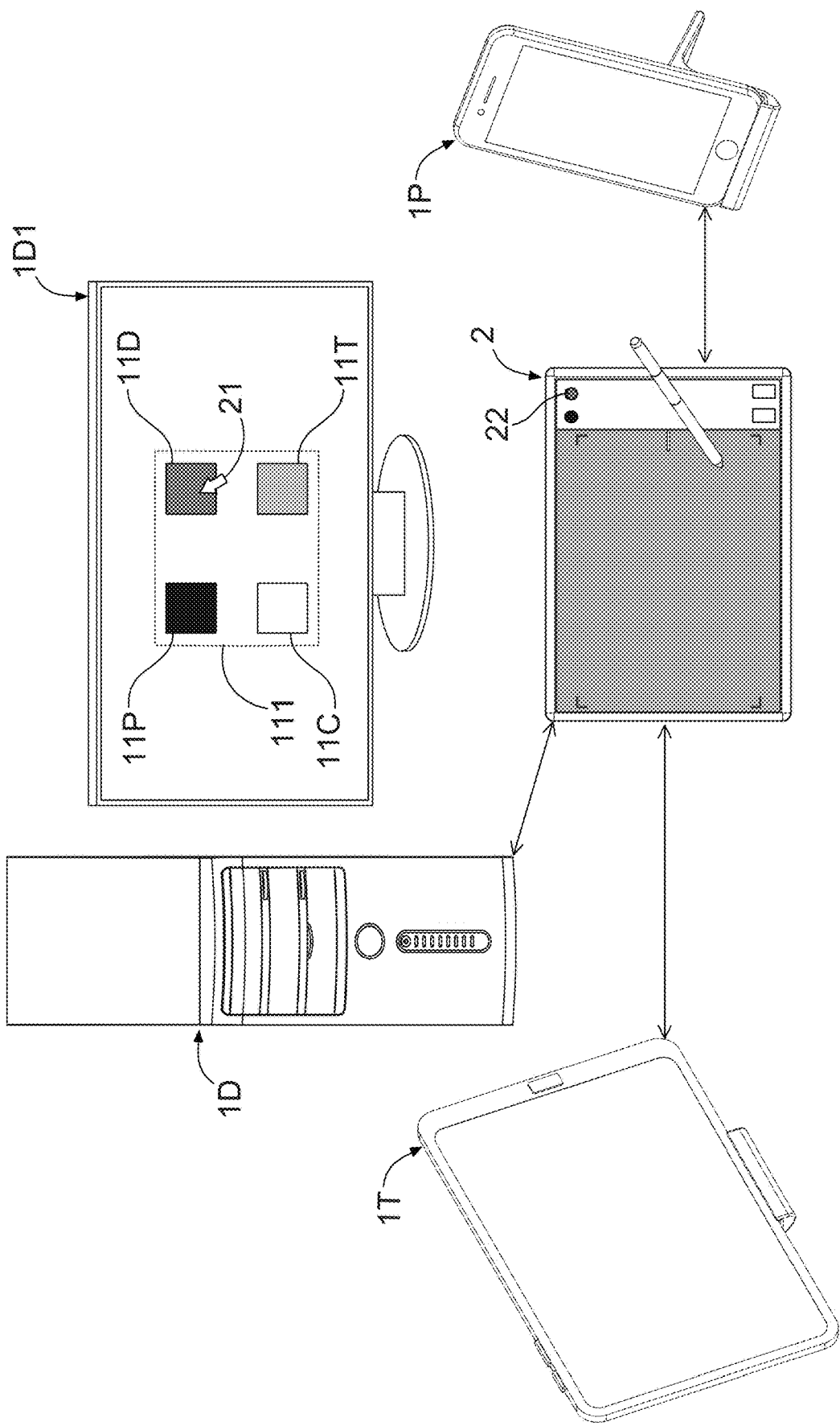
FIG. 7 shows a diagram for describing an application of an intellectual host switching system according to the present invention.

FIG. 7 shows a diagram for describing an application of an intellectual host switching system according to the present invention. From FIG. 7, it is known that the wireless inputting device 2 is a wireless electronic graphing device comprising a graphing pen and a graphing pad having a connection indicating light, and the pointer 21 is a dot cursor. By letting the graphing pen move on the graphing pad, the dot cursor correspondingly can be moved to click the second color region 11T so as to make the wireless inputting device 2 that is being wirelessly connected with the desk computer 1D be switched to be wirelessly connected with the tablet computer 1T. Of course, by letting the graphing pen move on the graphing pad, user can move the pointer 21 into the first color region 11D, and then interrupt the wireless connection between the wireless inputting device 2 and the desk computer 1D.

Figure 8:
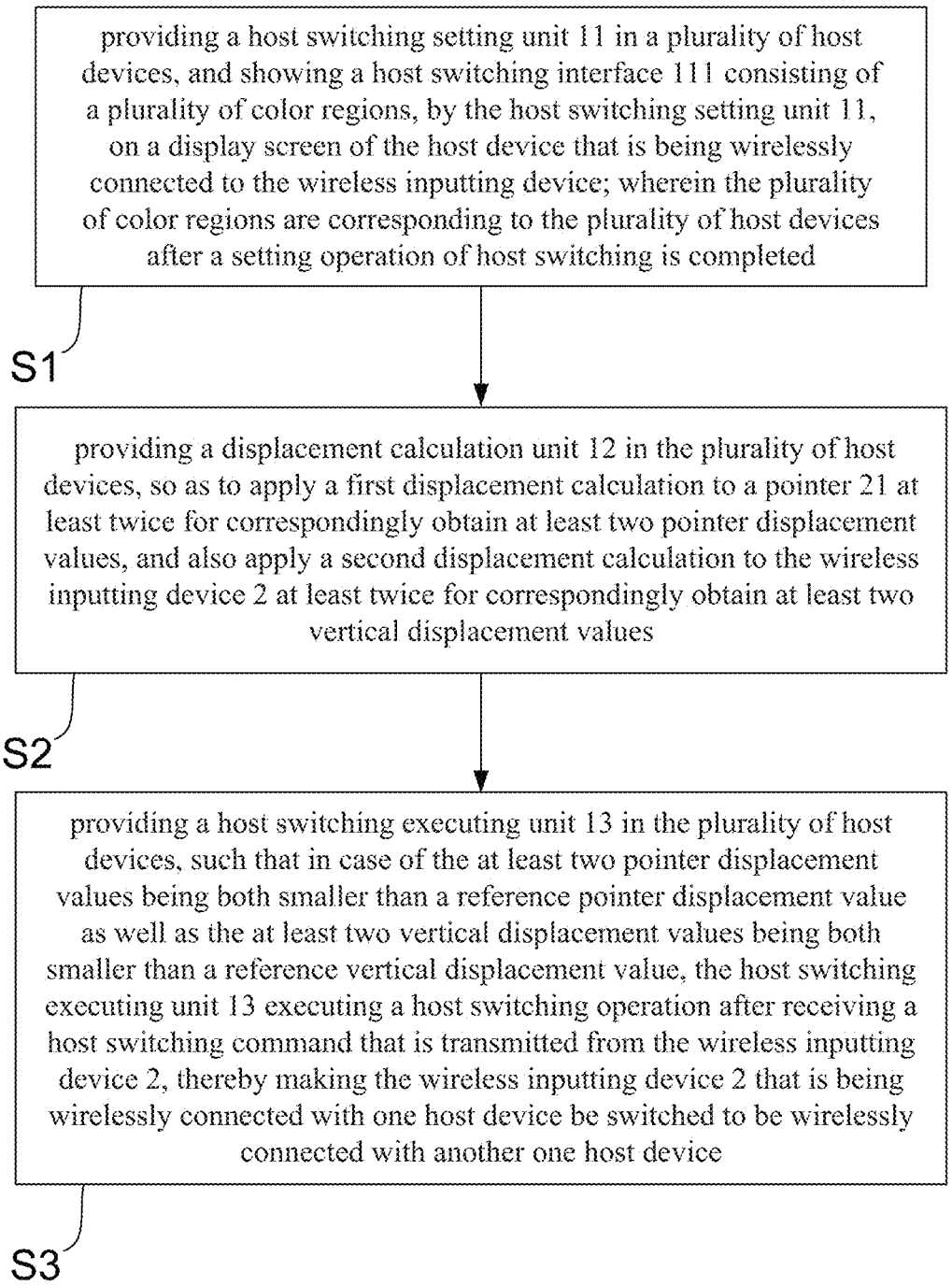
FIG. 8 shows a flowchart diagram of an intellectual host switching method according to the present invention.

Please refer to FIG. 2 and FIG. 3 again, and please simultaneously refer to FIG. 8 that shows a flowchart diagram of an intellectual host switching method according to the present invention. The present invention also discloses an intellectual host switching method for being applied for executing a host switching operation to make one wireless inputting device 2 that is being wirelessly connected to one host device be switched to be wirelessly connected to another one host device. The method comprising following steps:

Step S1: providing a host switching setting unit 11 in a plurality of host devices, and showing a host switching interface 111 consisting of a plurality of color regions, by the host switching setting unit 11, on a display screen of the host device that is being wirelessly connected to the wireless inputting device 2; wherein the plurality of color regions are corresponding to the plurality of host devices after a setting operation of host switching is completed.

Step S2: providing a displacement calculation unit 12 in the plurality of host devices, so as to apply a first displacement calculation to a pointer 21 at least twice for correspondingly obtain at least two pointer displacement values, and also apply a second displacement calculation to the wireless inputting device 2 at least twice for correspondingly obtain at least two vertical displacement value.

Step S3: providing a host switching executing unit 13 in the plurality of host devices, such that in case of the at least two pointer displacement values being both smaller than a reference pointer displacement value as well as the at least two vertical displacement values being both smaller than a reference vertical displacement value, the host switching executing unit 13 executing a host switching operation after receiving a host switching command that is transmitted from the wireless inputting device 2, thereby making the wireless inputting device 2 that is being wirelessly connected with one host device be switched to be wirelessly connected with another one host device.

Moreover, the method of the present invention further comprises an additional step S4: in case of the at least two pointer displacement values being both smaller than the reference pointer displacement value as well as the at least two vertical displacement values being both smaller than the reference vertical displacement value, the host switching executing unit 13 executing a wireless connection interrupting operation after receiving a wireless connection interrupting command that is transmitted from the wireless inputting device 2, thereby interrupting a wireless connection between the wireless inputting device 2 and the host device.

Therefore, above descriptions have introduced the embodiments of the intellectual host switching system and method of the present invention clearly and completely. However, any modification to the present invention made by a person skilled in the art does not depart from the protection scope defined by the appended claims.

What is claimed is:

1. An intellectual host switching system, being applied in a plurality of host devices, so as to execute a host switching operation to make one wireless inputting device that is being wirelessly connected to one host device be switched to be wirelessly connected to another one host device, and comprising:

a host switching setting unit, being configured for providing a host switching interface consisting of a plurality of color regions on a display screen of the host device that is being wirelessly connected to the wireless inputting device, wherein the plurality of color regions are corresponding to the plurality of host devices after a setting operation of host switching is completed;

a displacement calculation unit, being configured for applying a first displacement calculation to a pointer that is shown on the display screen of the host device, and applying a second displacement calculation to the wireless inputting device; and a host switching executing unit;

wherein after the pointer is moved to be in one of the plurality of color regions, the displacement calculation unit executing the first displacement calculation at least twice so as to correspondingly obtain at least two pointer displacement values, and the displacement calculation unit also executing the second displacement calculation at least twice for correspondingly obtain at least two vertical displacement values;

wherein in case of the at least two pointer displacement values being both smaller than a reference pointer displacement value as well as the at least two vertical displacement values being both smaller than a reference vertical displacement value, the host switching executing unit executing a host switching operation after receiving a host switching command that is transmitted from the wireless inputting device, thereby making the wireless inputting device that is being wirelessly connected with one host device be switched to be wirelessly connected with another one host device.

2. The intellectual host switching system according to claim 1, wherein the host device is selected from the group consisting of desk computer, industrial computer, tablet computer, smart phone, and smart TV.

3. The intellectual host switching system according to claim 1, wherein the pointer is a cursor, and the wireless inputting device being a wireless mouse having a connection indicating light; wherein after making the wireless inputting device that is being wirelessly connected with one host device be switched to be wirelessly connected with another one host device by moving the pointer into a specific color region, the connection indicating light emitting an indication light, and a color of the indication light being the same as that of the specific color region.

4. The intellectual host switching system according to claim 3, wherein the wireless mouse includes a lift of distance (LOD) sensor, and the displacement calculation unit receiving an LOD signal transmitted from the LDO sensor so as to complete the second displacement calculation.

5. The intellectual host switching system according to claim 3, wherein the host switching command is transmitted out by the wireless inputting device after a left mouse button is pressed.

6. The intellectual host switching system according to claim 5, wherein in case of the at least two pointer displacement values being both smaller than the reference pointer displacement value as well as the at least two vertical displacement values being both smaller than the reference vertical displacement value, the host switching executing unit executing a wireless connection interrupting operation after receiving a wireless connection interrupting command that is transmitted from the wireless inputting device, thereby interrupting a wireless connection between the wireless inputting device and the host device.

7. The intellectual host switching system according to claim 6, wherein the wireless connection interrupting command is transmitted out by the wireless inputting device after a right mouse button is pressed.

8. The intellectual host switching system according to claim 1, wherein the pointer is a cursor, and the wireless inputting device being a wireless computer keyboard having a connection indicating light and a cursor movement controlling unit; wherein after making the wireless inputting device that is being wirelessly connected with one host device be switched to be wirelessly connected with another one host device by moving the pointer into a specific color region, the connection indicating light emitting an indication light, and a color of the indication light being the same as that of the specific color region.

9. The intellectual host switching system according to claim 8, wherein the cursor movement controlling unit is selected from the group consisting of trackball, touchpad, and a plurality of key buttons of the wireless computer keyboard that is configured for being as a cursor movement controller.

10. The intellectual host switching system according to claim 1, wherein the pointer is a mouse cursor or a dot cursor, and the wireless inputting device being a wireless electronic graphing device comprising a graphing pen and a graphing pad having a connection indicating light; wherein after making the wireless inputting device that is being wirelessly connected with one host device be switched to be wirelessly connected with another one host device by moving the pointer into a specific color region, the connection indicating light emitting an indication light, and a color of the indication light being the same as that of the specific color region.

11. An intellectual host switching method, being applied for executing a host switching operation to make one wireless inputting device that is being wirelessly connected to one host device be switched to be wirelessly connected to another one host device, and comprising following steps:

(1) providing a host switching setting unit in a plurality of host devices, and showing a host switching interface consisting of a plurality of color regions, by the host switching setting unit, on a display screen of the host device that is being wirelessly connected to the wireless inputting device; wherein the plurality of color regions are corresponding to the plurality of host devices after a setting operation of host switching is completed;

(2) providing a displacement calculation unit in the plurality of host devices, so as to apply a first displacement calculation to a pointer at least twice for correspondingly obtain at least two pointer displacement values, and also apply a second displacement calculation to the wireless inputting device at least twice for correspondingly obtain at least two vertical displacement values; and (3) providing a host switching executing unit in the plurality of host devices, such that in case of the at least two pointer displacement values being both smaller than a reference pointer displacement value as well as the at least two vertical displacement values being both smaller than a reference vertical displacement value, the host switching executing unit executing a host switching operation after receiving a host switching command that is transmitted from the wireless inputting device, thereby making the wireless inputting device that is being wirelessly connected with one host device be switched to be wirelessly connected with another one host device.

12. The intellectual host switching system according to claim 11, wherein the host device is selected from the group consisting of desk computer, industrial computer, tablet computer, smart phone, and smart TV.

13. The intellectual host switching method according to claim 11, wherein the pointer is a cursor, and the wireless inputting device being a wireless mouse having a connection indicating light; wherein after making the wireless inputting device that is being wirelessly connected with one host device be switched to be wirelessly connected with another one host device by moving the pointer into a specific color region, the connection indicating light emitting an indication light, and a color of the indication light being the same as that of the specific color region.

14. The intellectual host switching method according to claim 11, wherein the wireless mouse includes a lift of distance (LOD) sensor, and the displacement calculation unit receiving an LOD signal transmitted from the LDO sensor so as to complete the second displacement calculation.

15. The intellectual host switching method according to claim 12, wherein the host switching command is transmitted out by the wireless inputting device after a left mouse button is pressed.

16. The intellectual host switching method according to claim 15, wherein in case of the at least two pointer displacement values being both smaller than the reference pointer displacement value as well as the at least two vertical displacement values being both smaller than the reference vertical displacement value, the host switching executing unit executing a wireless connection interrupting operation after receiving a wireless connection interrupting command that is transmitted from the wireless inputting device, thereby interrupting a wireless connection between the wireless inputting device and the host device.

17. The intellectual host switching method according to claim 16, wherein the wireless connection interrupting command is transmitted out by the wireless inputting device after a right mouse button is pressed.

18. The intellectual host switching method according to claim 11, wherein the pointer is a cursor, and the wireless inputting device being a wireless computer keyboard having a connection indicating light and a cursor movement controlling unit; wherein after making the wireless inputting device that is being wirelessly connected with one host device be switched to be wirelessly connected with another one host device by moving the pointer into a specific color region, the connection indicating light emitting an indication light, and a color of the indication light being the same as that of the specific color region.

19. The intellectual host switching method according to claim 18, wherein the cursor movement controlling unit is selected from the group consisting of trackball, touchpad, and a plurality of key buttons of the wireless computer keyboard that is configured for being as a cursor movement controller.

20. The intellectual host switching method according to claim 11, wherein the pointer is a mouse cursor or a dot cursor, and the wireless inputting device being a wireless electronic graphing device comprising a graphing pen and a graphing pad having a connection indicating light; wherein after making the wireless inputting device that is being wirelessly connected with one host device be switched to be wirelessly connected with another one host device by moving the pointer into a specific color region, the connection indicating light emitting an indication light, and a color of the indication light being the same as that of the specific color region.

* * * * *